R. IRWIN.
RADIATOR TRUCK.
APPLICATION FILED JUNE 15, 1912.

1,072,234.

Patented Sept. 2, 1913.

2 SHEETS—SHEET 1.

Witnesses

R. Irwin,
Inventor by C. A. Snow & Co.
Attorneys

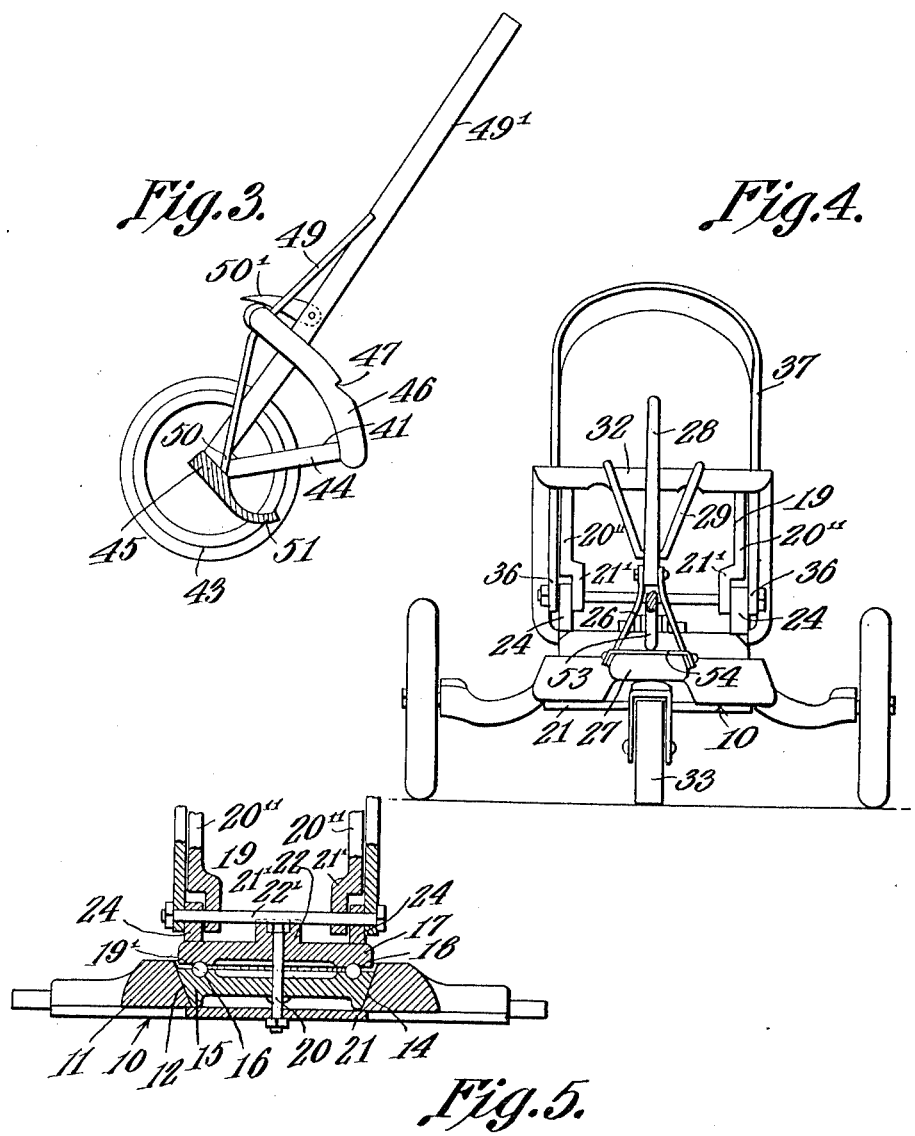

UNITED STATES PATENT OFFICE.

RICHARD IRWIN, OF FARMINGTON, MISSOURI.

RADIATOR-TRUCK.

1,072,234.  Specification of Letters Patent.  Patented Sept. 2, 1913.

Application filed June 15, 1912. Serial No. 703,899.

*To all whom it may concern:*

Be it known that I, RICHARD IRWIN, a citizen of the United States, residing at Farmington, in the county of San Francois and State of Missouri, have invented a new and useful Radiator-Truck, of which the following is a specification.

This invention relates to an improvement in trucks for transporting radiators.

The primary object of the invention is to provide a truck in which the radiator may be positioned on the same and lifted from the floor by movement imparted to the truck.

A further object of the invention is to provide a truck which will securely hold a radiator against displacement while the same is being conveyed.

A still further object of the invention is to provide a construction in which the radiator may be positioned on the same, conveyed and deposited without the hands of the operator coming into contact with the same.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

Figure 1:
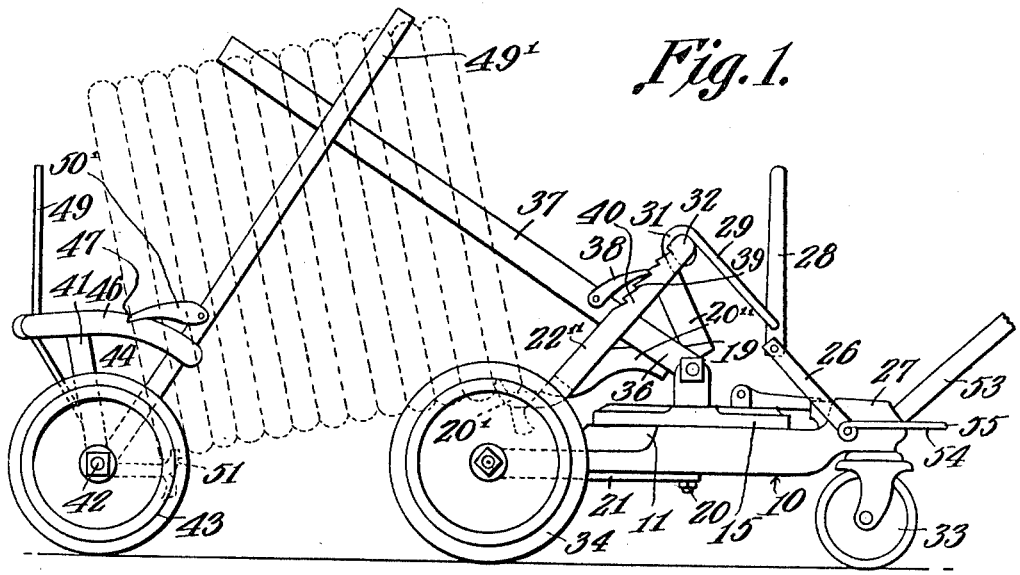
Figure 2:
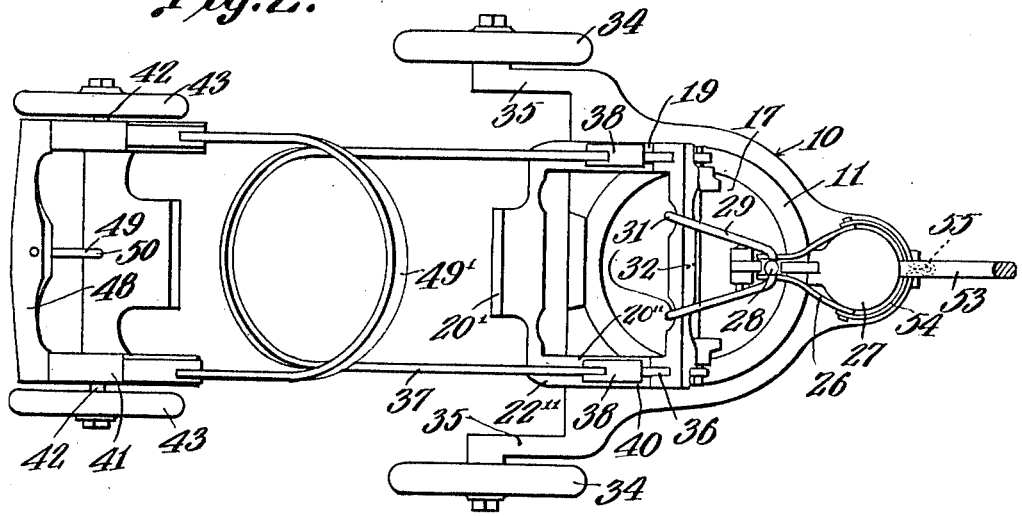

In the drawings:—Figure 1 is a side elevation showing the radiator in position. Fig. 2 is a top plan view. Fig. 3 is a detail view of the rear truck. Fig. 4 is a front elevation of the radiator engaging member. Fig. 5 is a detail view of the forward truck.

In the drawings, 10 designates the base of the forward truck which consists of the central portion 11 which is formed with the opening 12 the wall 14 of which is tapered to receive the member 15 which is provided with the ball race 16, the member 17 which is provided ball race 18 being disposed in superposed relation with the member 15, balls 19 being disposed between the members, and a bolt 20 passing through the members and the base plate 21. Said bolts extend within the boss 22 of the upper member 17, the upper member thus being rotatively supported on the lower member. The upper member supports the radiator supporting member 19 which is substantially rectangular, although this configuration is not essential to the operation of the device. This member is formed with a curved extension 20' which is arranged to engage the base of the radiator. The member 19 is formed with a plurality of arms 20" the portion 21' which connects said arms forming bearings, these bearings receiving a shaft 22' supported by the upstanding ears 24 which are formed integral with or secured to the upper member 17. The member 19 is thus supported by the member 17 and may therefore rotate therewith. The member 19 when brought to this position is in a position to receive the base of the radiator. A yoke 26 is pivotally supported by portion 27 of the truck base, said yoke being manipulated by the handles 28, a plurality of arms 29 being supported adjacent the pivot point of the handle or lever 28, these arms terminating in the curved offsets 31 which engage the bar 32 of the member 19 to raise the same after the extension 20' has been placed under the radiator. By this construction it will be noted that after the member 19 has been placed in a position to engage the base of the radiator, the same may be lifted to raise the radiator, by manipulating the lever 28, the lever 28 swinging on the pivot, the lever and its supporting yoke being moved relative to the truck base when necessary. The truck base is provided with the caster 33 and the wheels 34 which latter are supported by the extensions 35 of the truck base, the extensions forming what may be termed a yoke permitting the truck to embrace the radiator when the same is brought to radiator engaging position. The terminals 36 of a yoke 37 are pivotally supported on the shaft 22', this yoke being provided with pawls 38 which engage a rack 39 arranged on the longitudinal bars 40 of the member 19, the yoke in this manner being held at any desired position with respect to the member 19, attention being called to the fact that the yokes are independently movable. This yoke is brought to the position shown in Fig. 1 to embrace the radiator after the same has been engaged by the extension 20 of the base 10.

It will be noted that the structure described above supports one end of the radiator. The other end of the radiator is supported by a two-wheeled truck, the same consisting of a frame to the sides of which are secured stub axles 42 for the suitable mounting of wheels thereon. This rear truck frame consists of arms or members 44 the lower ends of which are secured to the transverse member 45 which member 45 is provided with an outstanding curved portion 51 upon which the radiator is adapted to rest. The upper ends of the arms or members 44 support curved bars 46, which bars are provided with suitable longitudinal slots therein in which travel the sides of the yoke bar 49'. The said yoke bar 49' is substantially U-shaped and the ends thereof are pivotally secured to the stub axles 42. Suitable notches 47 are provided in the curved bars 46 and pawls 50' are secured to the yoke bar 49' and are adapted to hold the said yoke bar in fixed relation with respect to the said bars 46. In order to provide a brace for the rear truck frame and to provide a handle by which the said frame may be manipulated the bar 49 is provided and is connected at its lower end to the transverse member 45, passes upward through the transverse member 48 which is connected to the rear portions of the curved bars 46 and extends upwardly therefrom as more clearly illustrated in Fig. 1, to thereby hold the radiator upon the said curved member 51 when the yoke 49 is moved downward and in contact with the upper portion of the radiator to thereby support the rear portion of the said radiator.

The radiator is supported by the yokes against displacement, the base of the radiator resting on the member 51 of the rear truck and the member 20' of the forward truck. When the radiator is positioned upon the members 51 and 20' the lever 28 is manipulated to swing the frame 19 on its pivot, the same being raised to lift the radiator from the surface on which the same is resting the radiator then being engaged by the yoke 37 and the yoke 49' and secured against displacement on the two trucks, the radiator forming a connection between the trucks whereby a single vehicle is provided. The structure may then be moved to convey the radiator, the same being propelled in any desired manner, the base being preferably provided with a tongue 53 or a yoke 54 may be provided which terminates in a loop 55 to which a cable may be attached.

The many advantages of a construction of this character will be clearly apparent as it will be noted that the radiator is lifted on the truck and lifted to a position where the same may be conveyed without the hands of the operator coming in contact with the radiator, the lifting of the radiator being produced in a simple and convenient manner.

What is claimed is:—

1. A truck for radiators comprising a frame, wheels mounted thereon, a rotatable member carried by said frame, means carried by said rotatable member for lifting and supporting a radiator, means engaging the upper portion of said radiator for holding said support in position.

2. A radiator truck consisting of two wheeled sections, means carried by each of the sections for engaging the base of a radiator, and means carried by each of the sections for extending over and bearing against the top of a radiator, to thereby hold the radiator base engaging means in a raised position.

3. A front supporting member for a radiator carrying device comprising a frame, wheels mounted thereon, and a rotatable member carried thereby, a radiator supporting member pivotally mounted upon said rotatable member, a yoke for engaging the upper surface of a radiator and holding said radiator engaging member in position by means of a ratchet and pawl.

4. In a device of the class described the combination of, a front supporting member comprising a frame, wheels supporting said frame, a rotatable member carried by said frame, a radiator supporting member pivotally connected to said rotatable member, a yoke pivotally connected to said rotatable member adapted to hold said radiator supporting member in an active position, a rear supporting member comprising a frame, two wheels connected thereto, said front and rear radiator supporting members being held in spaced relation by a radiator interposed therebetween and carried thereon, a radiator supporting member carried by said rear frame, a yoke pivotally supported thereon and adapted to hold said rear radiator supporting member in an active position.

In testimony that I claim the foregoing as my own, I have hereto affixed my signature in the presence of two witnesses.

RICHARD IRWIN.

Witnesses:
  A. S. DAVIS,
  HOMER CARVER.